Nov. 18, 1952     V. R. SCHMITTROTH     2,618,227
MACHINE FOR FORMING DOUGH INTO ROLLS AND THE LIKE
Filed Aug. 25, 1950     4 Sheets-Sheet 1

Vincent R. Schmittroth
INVENTOR.

BY *Clarence A. O'Brien*
*and Harvey B. Jacobson*
Attorneys

Nov. 18, 1952 V. R. SCHMITTROTH 2,618,227
MACHINE FOR FORMING DOUGH INTO ROLLS AND THE LIKE
Filed Aug. 25, 1950 4 Sheets—Sheet 2

Vincent R. Schmittroth
INVENTOR.

BY Clarence A. O'Brien
and Harvey B. Jackson
Attorneys

Nov. 18, 1952 V. R. SCHMITTROTH 2,618,227
MACHINE FOR FORMING DOUGH INTO ROLLS AND THE LIKE
Filed Aug. 25, 1950 4 Sheets-Sheet 3
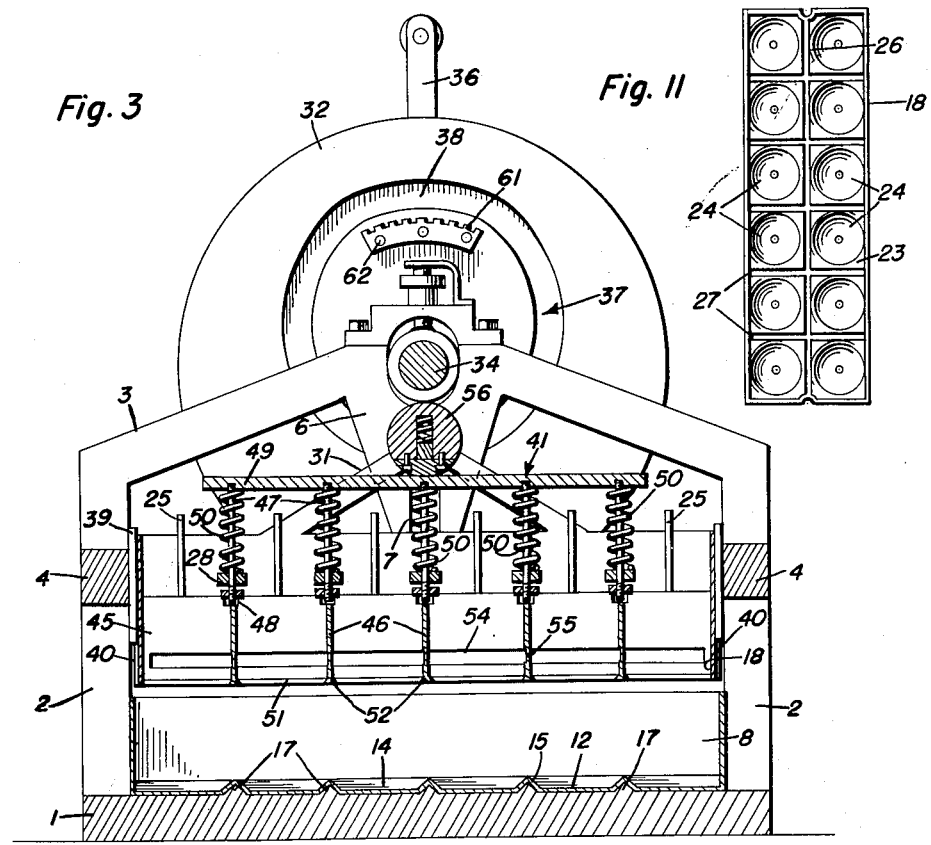
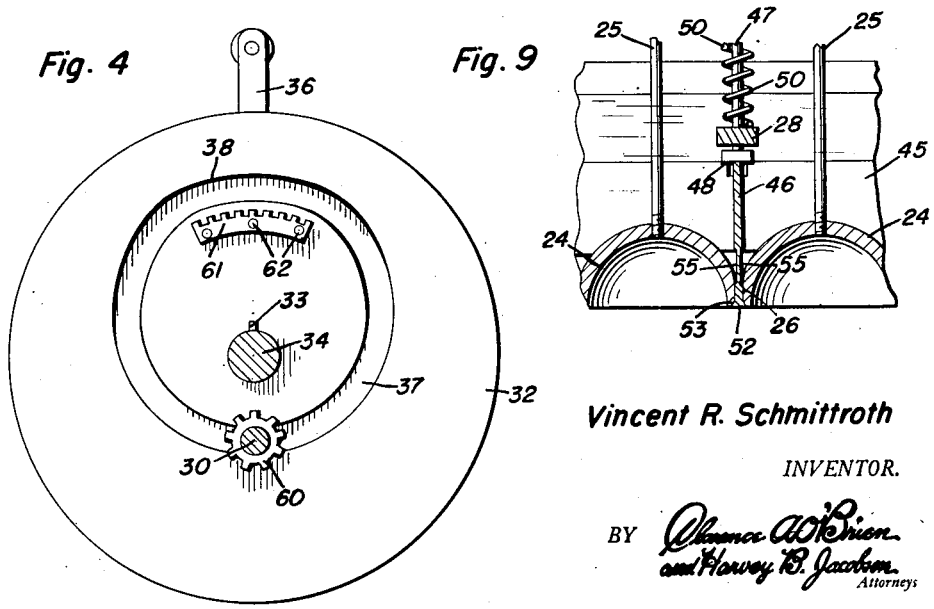
Vincent R. Schmittroth
INVENTOR.

Nov. 18, 1952 V. R. SCHMITTROTH 2,618,227
MACHINE FOR FORMING DOUGH INTO ROLLS AND THE LIKE
Filed Aug. 25, 1950 4 Sheets-Sheet 4
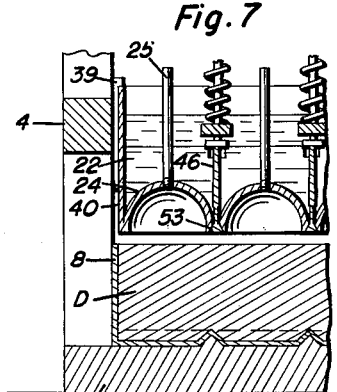
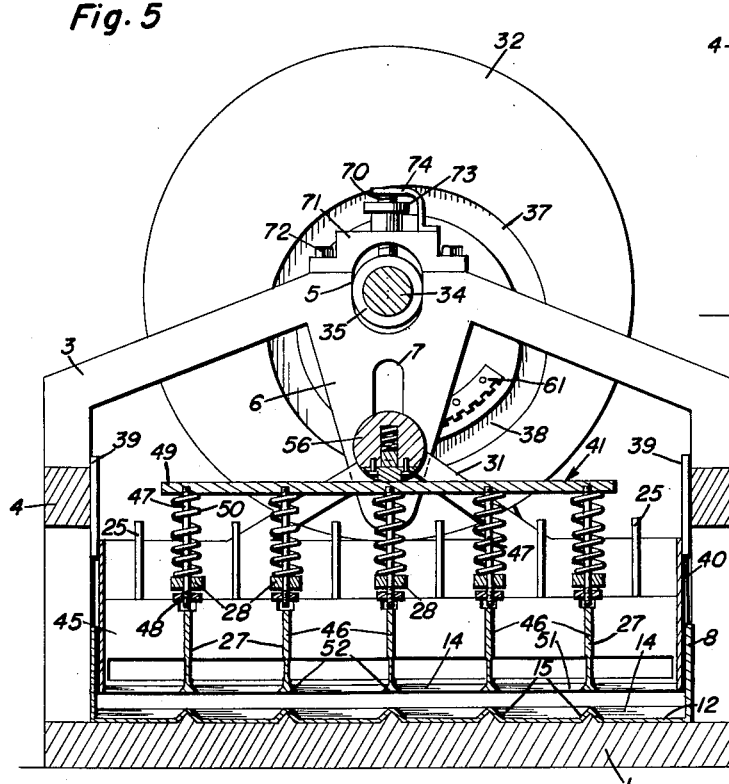
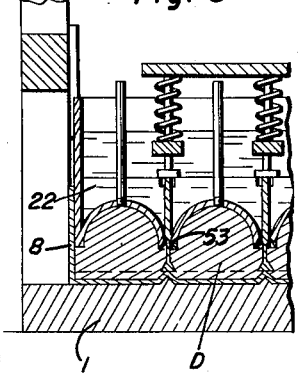
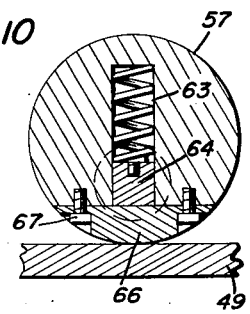
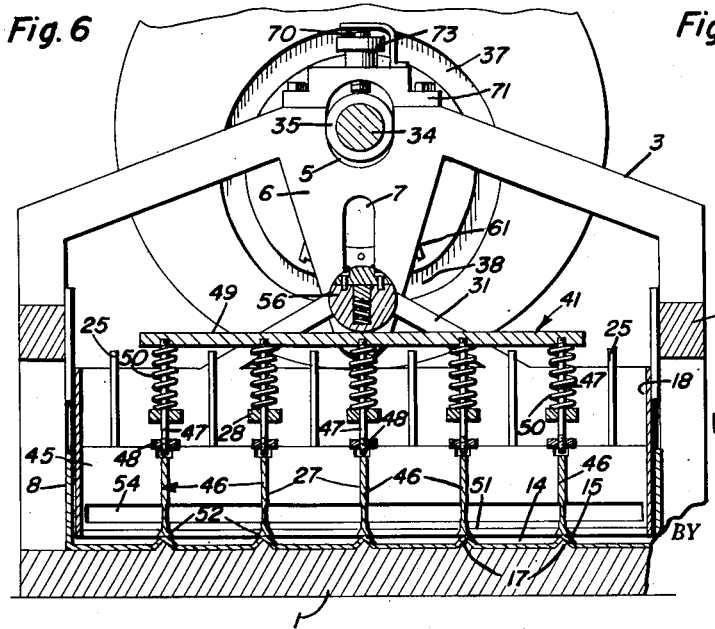
Vincent R. Schmittroth
INVENTOR.

Patented Nov. 18, 1952

2,618,227

UNITED STATES PATENT OFFICE 2,618,227

MACHINE FOR FORMING DOUGH INTO ROLLS AND THE LIKE

Vincent R. Schmittroth, Dillon, Mont.

Application August 25, 1950, Serial No. 181,434

10 Claims. (Cl. 107—20)

My invention relates to improvements in machines for forming dough into rolls, and similar baking products, in baking pans.

By way of explanation, in modern baking, dough from high speed mixers is divided into a desired number of pieces, which are then passed to a rounder which forms the pieces into balls. At this point, the pieces, or balls, have acquired a skin and a cell structure. The rounded pieces, or balls, are then conveyed from a proofer, or raiser, to a molder which flattens the same and rolls the flattened product spirally into cylindrical loaves for baking, after further proofing, or raising, in the usual pans. The molder, in rolling the flattened pieces, uses flour to prevent the convolutions in the rolls from adhering, which is necessary later, during baking in the formation of the roll. This results in gas cell areas in the loaves, and in the baked product uneven texture and large holes. To alleviate this condition, bakers resort to cutting the molded loaves, usually in four sections, which is known in the trade as "blocking," but such "blocking" leaves raw skinless dough exposed, which results, in the baked product, in surface holes and like imperfections.

With the foregoing in mind, it is the primary object of my invention to provide a machine for forming the molded loaves of dough in baking pans and dividing the same, without cutting, or "blocking," into rolls in which the dough properly adheres and raw skinless areas are obviated so that the baked product will be of proper uniform texture throughout and free from imperfections, particularly in the form of holes in the sides thereof.

Another object is to provide a machine for the purpose set forth, by means of which the rolls are completely separated so as to obviate contact between the same and thereby facilitate uniform baking and provide rolls of uniform size.

Still another object is to provide in such a machine for greasing the sides of the divided rolls in the pan and uniformly, without waste of grease.

Still another object is to provide an inexpensive machine for accomplishing the purposes set forth in the foregoing which is easy to clean and maintain sanitary and which is substantially foolproof and easy to operate.

Other and subordinate objects, within the purview of my invention, together with the precise nature of my improvements, will be readily understood when the succeeding description and claims are read with reference to the drawings accompanying and forming part of this specification.

In said drawings:

Figure 3 is a view in vertical transverse section taken on the line 3—3 of Figure 1;

Figure 4 is a view in vertical transverse section taken on the line 4—4 of Figure 1;

Figure 5 is a view in transverse section taken on the same line of Figure 1 as Figure 3, but illustrating the position of the parts when the presser heads are fully lowered and the dough dividers are partly lowered therewith;

Figure 6 is a similar view illustrating the position of the parts when the dough dividers are fully lowered;

Figure 7 is a fragmentary view in vertical transverse section with the parts in normal starting position and taken on the line 7—7 of Figure 2 and with a baking pan filled with dough and the presser heads containing grease, or oil;

Figure 8 is a fragmentary sectional view on the same line of Figure 2 as Figure 7 and with the presser heads and dough divider in lowered position;

Figure 9 is a fragmentary sectional view in vertical transverse section taken on the same line of Figure 2 as Figures 7 and 8, but drawn to a larger scale for clearer illustration;

Figure 10 is a detail view in vertical section taken on the line 10—10 of Figure 1 and illustrating, on a larger scale, one of the dough divider operating cams;

Figure 11 is a detail view in bottom plan drawn to a smaller scale of one of the presser heads;

Figure 12 is a fragmentary view in perspective of one of the dough dividers, drawn to a larger scale;

Figure 14 is a view in plan of the insert for the baking pan.

Figure 1:
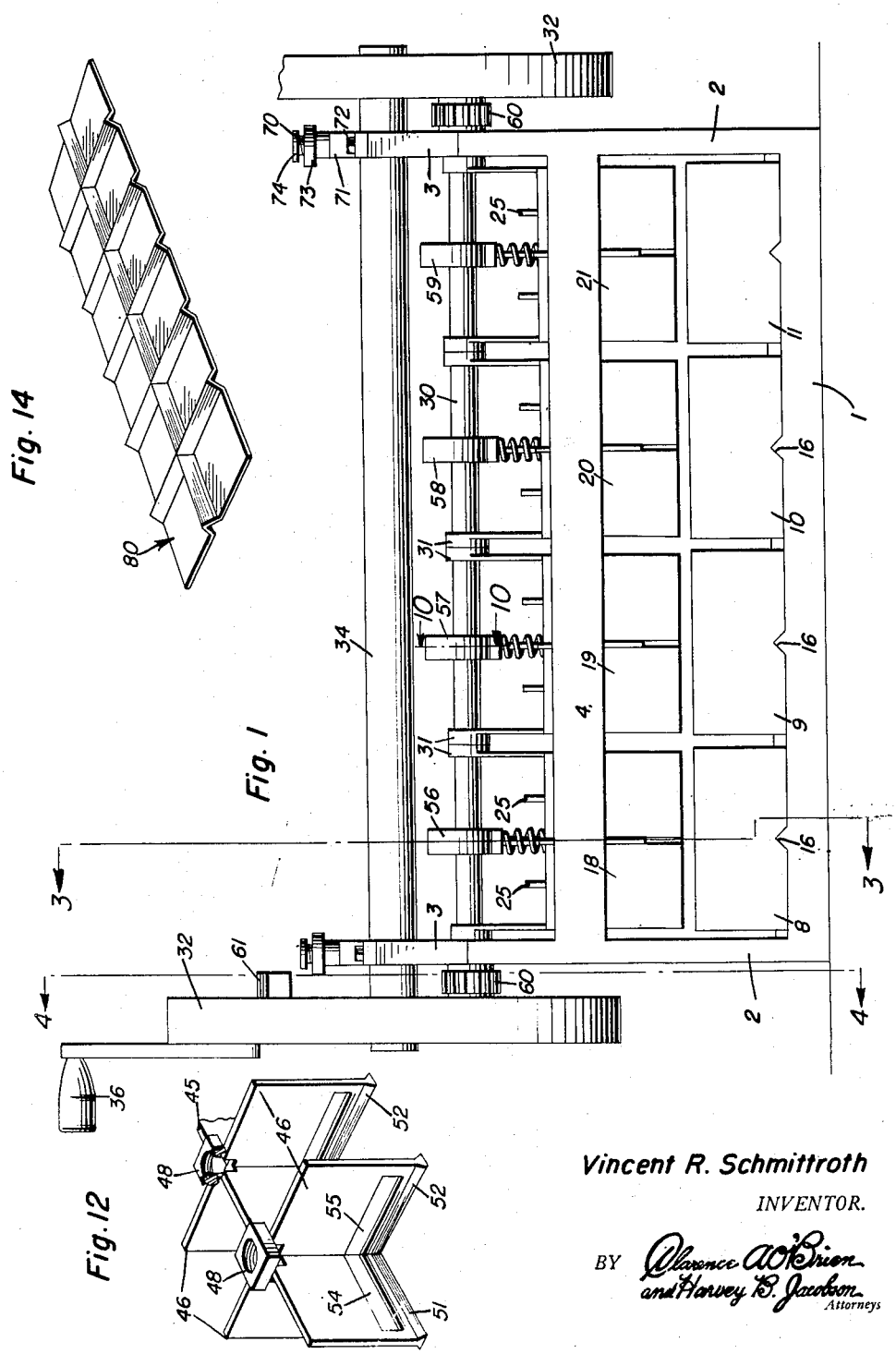
Figure 1 is a view in side elevation of my improved machine in the preferred embodiment thereof with the parts shown in normal starting position.
Figure 2:
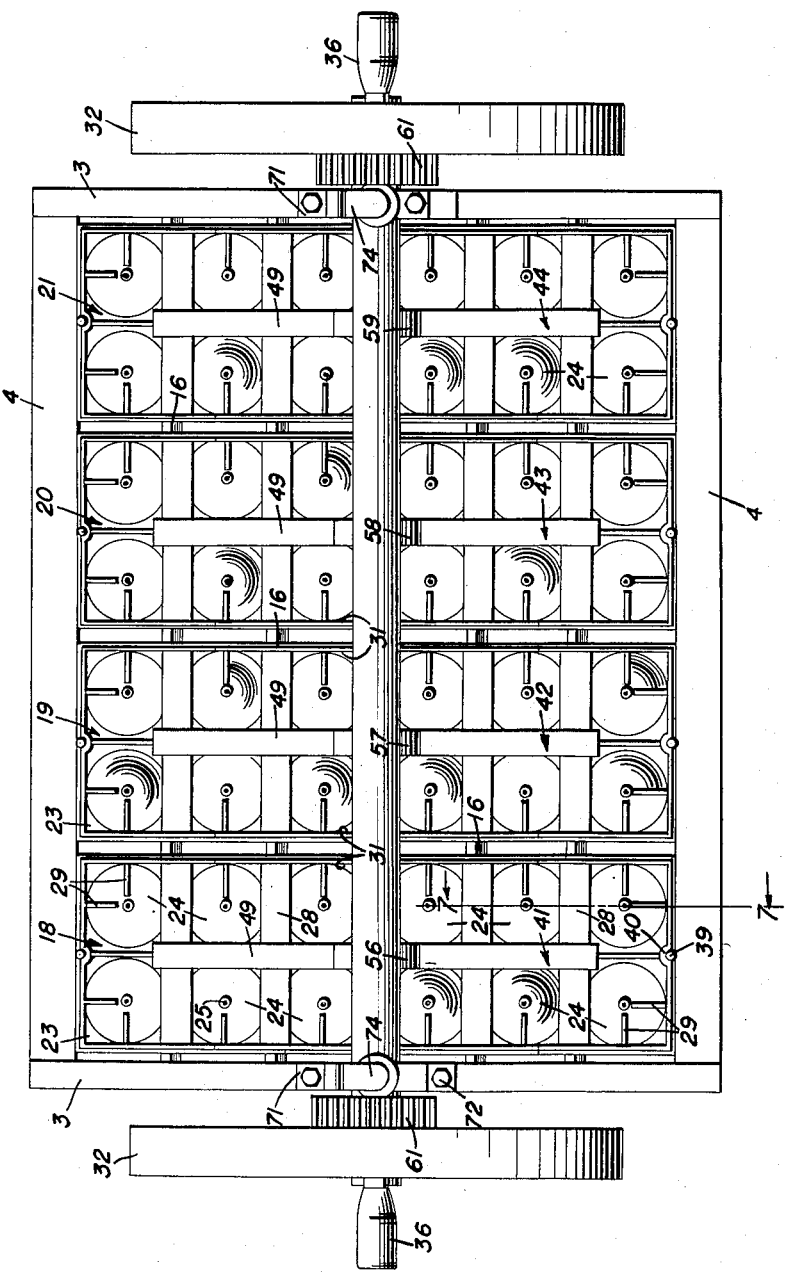
Figure 2 is a view in plan of the same.
Figure 13:
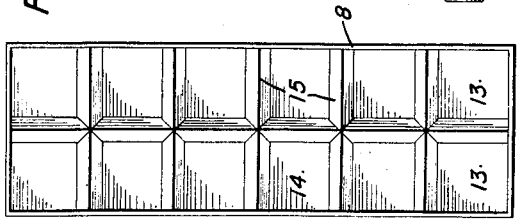
Figure 13 is a view in plan drawn to a smaller scale on one of the baking pans.

Referring to the drawings by numerals, my improved machine, as illustrated, comprises an oblong, rectangular base plate 1 having end pairs of corner posts 2 connected in each pair by a top cross-bar 3. A pair of longitudinal, upper side bars 4 connect the corner posts at opposite sides of said plate 1. The cross-bars 3 are each formed with a top center recess 5 and a depending central portion 6 with a central vertical guide slot 7 therein, all for a purpose presently explained.

A plurality of oblong, rectangular baking pans 8, 9, 10, 11 are removably seated on the base plate 1 to extend endwise across the same in side-by-side, spaced apart relation. The baking pans 8, 9, 10, 11 are alike and a description of one will suffice for all.

Each baking pan comprises a bottom 12 divided into longitudinal and transverse rows of square pockets 13 of the approximate size of the bottom of the rolls to be baked, said pockets 13 being formed by a longitudinal rib 14 and transverse ribs 15 upstanding on said bottom 12 and which are of hollow inverted V-shape in cross section and formed in said bottom. The longitudinal and transverse ribs 14, 15 of the pans 8, 9, 10, 11 fit over similarly arranged longitudinal and transverse ribs 16, 17 formed on top of the base plate 1, whereby said pans are spaced apart side by side and parallel when seated and held centered crosswise of said base plate 1.

A plurality of vertically reciprocating presser heads 18, 19, 20, 21 of the same shape as the baking pans 8, 9, 10, 11 are slidably fitted therein and suspended above said pans for lowering into and raising out of associated subjacent pans, by means to be described.

The presser heads 18, 19, 20, 21 are also alike and, therefore, only one need be described. Each presser head has the form of a pan for containing cooking grease, or oil, 22 as shown in Figures 7 and 8, and the bottom 23 of each presser head is formed with longitudinal and transverse rows of dome-like molds 24, substantially semi-circular in cross-section, and vertically aligned with the pockets 13 in the subjacent associated baking pan to mold the tops of the rolls to be baked, in a manner presently apparent. A central vent pipe 25 rises from each mold 24 for venting gas out of the molds. The bottom 23 of each presser head is provided with a longitudinal central guide slot 26 and with transverse guide slots 27 intermediate the longitudinal and transverse rows of molds 24, respectively, said slot 26 and the slots 27 being vertically aligned with the longitudinal ribs 14 and transverse ribs 15, respectively, in the subjacent baking pans. Cross-bars 28 are provided in each presser head in vertical alignment with the transverse guide slots 27, the purpose of which, together with that of the guide slots 26, 27 being presently explained. Fins 29 on each presser head on top of the molds 24 reinforce said molds.

Means for suspending the presser heads 18, 19, 20, 21 and reciprocating the same are provided as follows: A longitudinal presser head operating and carrying shaft 30 extends horizontally along the vertical longitudinal center of the base plate 1 through the beforementioned guide slots 7 in which it is rotatable and vertically slidable above the baking pans 8, 9, 10, 11. Bearing brackets 31 rising from the sides of the presser heads 18, 19, 20, 21 and through which said shaft 30 is journaled suspend said presser heads from said shaft 30.

A pair of manually operative wheels 32 for raising and lowering said shaft 30 are keyed, as at 33, outwardly of the cross-bars 3 on opposite ends of a horizontal connecting shaft 34 extending above said shaft 30, parallel therewith, and journaled in hanger bearings 35 fitted in the recesses 5 before mentioned for vertical adjustment in said recesses for a purpose presently seen. A hand crank 36 is provided on each wheel 32 for rotating the same.

An eccentric cam groove 37 is provided in the inner face of each wheel 32 and the ends of said shaft 30 ride in said grooves. The eccentric grooves 37 are formed in said wheels 32 so that in the full cycle position of said wheels, or the starting position, as shown in Figures 3 and 4, said shaft 30 is raised by said grooves 37 to raise the presser heads 18, 19, 20, 21 out of the baking pans 8, 9, 10, 11 into normal starting position. The eccentric grooves 37 are each provided with a dwell portion 38 concentric to the axis of rotation of the wheels and forming a high portion in each eccentric groove 37 which, in the full cycle position of said wheels 32, is uppermost, as shown in Figure 3.

The arrangement of the described eccentric grooves 37 is such that rotation of either wheel 32, as may be most convenient, from full cycle, or starting, position, in either direction, substantially 140° will cause said grooves 37 to lower the presser head operating and carrying shaft 30 to lower the presser heads 18, 19, 20, 21 from normal position into the baking pans 8, 9, 10, 11 to the extent shown in Figure 6, whereby the molds 24 will compress dough D disposed in said pans, as shown in Figure 7, to form the tops of the rolls, as shown in Figure 8. Further rotation of either wheel 32 in the same direction, through substantially 49°, will cause the dwell portions 38 to hold said shaft 30 and the presser heads 18, 19, 20, 21 lowered and stationary temporarily for a rest period, and still further rotation of either wheel 32 in the same direction, back into full cycle, or starting position, will raise said shaft 30 to raise said presser heads out of the baking pans 8, 9, 10, 11 back into starting position.

Vertical guides 39 on the side bars 4 coacting with vertical, central end grooves 40 in the presser heads 18, 19, 20, 21 guide said heads into and out of the baking pans 8, 9, 10, 11.

The presser heads 18, 19, 20, 21 carry respectively, dough dividers designated as units 41, 42, 43, 44 operative for vertical reciprocation relative to said heads. Each divider comprises a longitudinal, upright divider blade 45 vertically slidable in the longitudinal guide slot 26 of the carrying presser head, and upright transverse divider blades 46 integral with the longitudinal blade 45 and vertically slidable in the transverse guide slots 27 of the carrying presser head, said blades 45, 46 slidably fitting at their ends in the side walls of the carrying presser head. Upright supporting thrust rods 47 at the intersections of said blades 45, 46 are slidably mounted in the cross-bars 28 and threaded into nuts 48 suitably fixed to the upper edges of said blades. The thrust rods 47 slidably extend upwardly through the cross-bars 28 of the carrying presser head and form part of divider operating mechanism presently fully described. A presser bar 49 connects the upper ends of the thrust rods of the dough dividers. Coil springs 50 on said rods 47 between the cross-bars 28 and the presser bar 49 yieldingly hold the divider blades 45, 46, thrust rods 47 and presser bar of the divider raised in the carrying presser head into normal position.

As best shown in Figures 7, 8, 9 and 12, the divider blades 45, 46 are formed with dovetailed, enlarged, flat bottom edges 51, 52, which, in the normal raised position of the divider, fit in correspondingly shaped bottom edges of the guide slots 26, 27, as shown at 53 in Figures 7, 8, 9 and in connection with the longitudinal slot 26. The bottom edges 51, 52 and bottom edges 53 form on the presser head and divider coacting valve means closing the bottom of the guide slots 26, 27, against escape of the grease, or oil, 22 out of the presser head in the normal raised position of the divider. Longitudinal side grooves 54, 55 in the divider blades 45, 46 register with the bottoms of the guide slots 26, 27 and open said slots when the divider is lowered to divide the dough 22 in a manner to be described.

The dough dividers 41, 42, 43, 44 are lowered from normal raised position by cam means as follows: Eccentric disks 56, 57, 58, 59 on the presser head carrying and operating shaft 30 are revolved by said shaft 30 in wiping engagement with the presser bars 49 of said dividers to lower said dividers relative to the presser heads 18, 19, 20, 21, and then release said dividers for raising by the coil springs 50 while said presser heads are lowered in stationary rest position. The presser head operating and carrying shaft 30 is rotated to revolve the eccentrics 56, 57, 58, 59 by means of end gear pinions 60 fast on said shaft and engaged by arcuate toothed racks 61 bolted, as at 62, to the inner sides of the wheels 32 within the confines of the eccentric grooves 37 and opposite the dwell portions 38 of said grooves.

Each eccentric, for example, eccentric 57, as shown in Figure 10, is formed with a diametrical square bore 63 in which a reduced squared portion 64 of said shaft 30 slidably fits and is backed by a coil spring 65 in said bore so that the eccentric may yieldingly slide crosswise of said shaft 30 as a safety provision in case of accidental blocking of downward movement of the dough dividers 41, 42, 43, 44. A cap segment 66 on each eccentric 56, 57, 58, 59, secured thereto by screws 67, closes the outer end of the bore 63.

The hanger bearings 35 include upright, threaded stems 70 vertically slidable for adjusting said bearings as occasion may require in blocks 71 bolted, as at 72, on the cross-bars 3 over the recesses 5. Collars 73 threaded on said stems 70 are provided for turning against said blocks to raise said stems 70 upwardly for adjusting said bearings in the recesses 5. Leaf springs 75 on said blocks 71 overlying and engaging said stems 70 yieldingly hold said bearings 35 against upward movement. The hanger bearings 35 are thus adjustable, as occasion may require, for instance, to take up wear.

The operation of my machine will now be described, briefly, as sufficient in connection with the foregoing. A molded, or rolled, loaf of dough D is placed in each baking pan 8, 9, 10, 11 with the presser heads 18, 19, 20, 21 and the dough dividers 41, 42, 43, 44 in normal raised, starting position previously described. After proper proofing, and with cooking grease, or oil, 22 in the presser heads 18, 19, 20, 21, the machine is operated by either wheel 32 to lower said presser heads for compressing the dough D to cause it to adhere throughout while, at the same time, molding or forming the tops of loaves into rounded form by means of the molds 24. As the presser heads 18, 19, 20, 21 are fully lowered into their stationary, temporary rest positions, in the manner previously described, the racks 61 engage the gear pinions 60 and rotate the presser head operating and carrying shaft 30 so that the eccentrics 56, 57, 58, 59 lower the dough dividers 41, 42, 43, 44, in the manner previously described, and permit the same to be subsequently raised by the coil springs 50. Lowering of the dough dividers 41, 42, 43, 44 causes the divider blades 45, 46 to descend and the bottom edges 51, 52 thereof to divide the loaves of dough D into rolls, said edges 51, 52 descending into engagement with the ribs 14, 15 and separating the dough D with a pinching action instead of a cutting action so that raw skinless sides on the rolls, formed by said blades, are obviated, with the result that proper texture will be obtained at the sides of the rolls in the finally baked product. As the divider blades 45, 46 descend, they open the bottom edges of the guide grooves 26, 27, in the manner already described, so that grease, or oil, 22 in the presser heads 18, 19, 20, 21 is carried out of said heads by the side grooves 54, 55 in the divider blades 45, 46 and wiped over the sides of the rolls formed by said blades, the grease, or oil, 22 serving the usual purpose in the baking. After the presser heads 41, 42, 43, 44 are again raised into normal position, the baking pans 8, 9, 10, 11 may be removed off the base plate and the rolls baked, in said pans, as desired.

As shown in Figure 14, an insert 80 for each baking pan may be provided of thin material and conforming in shape to the bottom of the pan to fit therein, and the rolls may be formed and divided by operation of the machine on the inserts which may be removed from the pans with the formed rolls thereon for the purpose of freezing the formed rolls for baking at a future time, or for sale as a frozen product.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a machine for forming and dividing dough into rolls and provided with a base supporting a pan for containing dough, the combination of a presser head embodying rows of molds for forming the tops of the rolls, slidably and rotatably mounted cam means movable downwardly bodily to move said head downwardly into said pan into a lowered temporary rest position to compress the dough and mold the tops of the rolls, a divider unit carried by said head and movable downwardly relative thereto to divide the dough between the rows of molds and form sides of the rolls, and means operative by rotation of said cam means to move said unit downwardly while said head is in said temporary rest position.

2. A machine according to claim 1 wherein said cam means comprises a horizontal shaft on which said head is suspended at opposite sides of said head, and hand wheels at the ends of said shaft having continuous eccentric grooves therein in which the ends of said shaft are suspended for downward movement by rotation of said wheels.

3. A machine according to claim 1 wherein said last-named means comprises a horizontal shaft, a spring tensioned presser bar on said unit, an eccentric on said shaft in wiping engagement with said bar, hand wheels at the ends of said shaft having continuous eccentric grooves therein in which the ends of the shaft are suspended for downward movement by rotation of said wheels, and a segmental rack and a gear pinion on one wheel and the shaft, respectively, for rotating said shaft in said grooves.

4. A machine according to claim 1 wherein said cam means comprises a horizontal shaft on which said head is suspended, hand wheels at the ends of the shaft having continuous eccentric grooves therein in which the ends of said shaft are suspended for downward movement by rotation of said wheels, said last-named means comprising a spring tensioned presser bar on said unit, an eccentric on said shaft for rotation thereby to move said presser bar downwardly, and coacting devices on said wheels and shaft for rotating said shaft in said grooves.

5. In a machine for forming and dividing dough into rolls and provided with a pan for containing dough and having upstanding bottom ribs of inverted V-shape in cross-section, the combination of a presser head embodying rows of molds for forming the tops of the rolls, means to move said head downwardly into said pan to compress the dough and form the tops of the rolls, a divider unit carried by said head and movable downwardly relative thereto to divide the dough between the rows of molds and form sides of the rolls, said unit comprising divider blades with flat bottomed enlarged lower edges for coaction with the edges of said ribs to divide the dough with a pinching action, and means to move said unit downwardly relative to said head after said head has moved downwardly.

6. In a machine for forming and dividing dough into rolls and provided with a pan for containing dough, the combination of a presser head forming a grease container and embodying rows of bottom molds for forming the tops of rolls, said head having bottom grease discharge slots therein between the rows of molds, means to move said head downwardly to compress the dough and mold the tops of the rolls, a divider unit carried by said head and embodying divider blades slidable downwardly in said slots to divide the dough between the rows of molds and form sides of the rolls, spring means tensioning said blades against downward movement from a normal position, enlarged bottom edge portions on said blades of dovetail cross-section closing said slots in the normal position of said blades, and means to move said blades downwardly in said slots to divide the dough and open said slots after said head has been moved downwardly in predetermined degree, said blades having longitudinal side grooves therein for conveying grease out of said slots.

7. A machine for forming and dividing dough into rolls comprising a stationarily mounted pan for receiving a mass of dough and having right angularly related raised bottom ribs therein forming pockets for the rolls, a hollow grease containing presser head mounted above said pan for downward movement to press the mass of dough into said pockets, a dough dividing unit carried by said presser head in contact with said grease for greasing said unit and comprising connected right angularly related vertical blades vertically aligned with said ribs and slidable from a normal position downwardly out of said presser head with enlarged flat bottomed lower edges coacting with said ribs to separate the mass of dough into rolls with a pinching action between said pockets upon downward sliding of said blades out of said presser head, means operative to move said presser head downwardly, and means operative by said first means to move said blades downwardly out of said presser head.

8. A machine according to claim 7 wherein said presser head is provided with right angularly related vertical slots in which said blades slide and discharging grease out of the bottoms thereof, said lower edges of said blades in the normal position of the blades seating upwardly in and closing the bottoms of said slot to prevent discharge of grease out of said slots.

9. A machine for forming and dividing a mass of dough into rolls comprising a hollow grease containing presser head mounted for downward movement against the mass of dough and provided with vertical right angularly related slots therein for discharging grease out of said presser head, a dough dividing unit carried by said presser head comprising connected right angularly related vertical blades in said slots and in contact with said grease and slidable from a normal position downwardly in said slots out of said presser head to divide the dough into rolls, said blades having enlarged dovetail lower edges seating upwardly in said slots to close the bottoms of said slots and prevent discharge of grease out of said slots, means operative to move said presser head downwardly, and means operative by said first named means to move said blades downwardly out of said presser head.

10. A machine according to claim 9, said blades having longitudinal grooves therein for conveying grease out of said slots.

VINCENT R. SCHMITTROTH.

REFERENCES CITED

The following references are of record in the file of this patent:

UNITED STATES PATENTS

| Number | Name | Date |
|---|---|---|
| 1,021,640 | Steitler | Mar. 26, 1912 |
| 1,309,419 | Rafert | July 8, 1919 |
| 1,779,876 | Gay | Oct. 28, 1930 |
| 1,851,328 | Rausch | Mar. 29, 1932 |
| 2,054,720 | Cederholm et al. | Sept. 15, 1936 |
| 2,231,223 | Page | Feb. 11, 1941 |